United States Patent
Jeong et al.

(10) Patent No.: US 6,721,561 B1
(45) Date of Patent: Apr. 13, 2004

(54) METHOD FOR BUILDING A HOME-ZONE DATABASE USING MEASURED POWER STRENGTH

(75) Inventors: Jae-Ho Jeong, Kwangyoshi (KR); Jae-Seong Bae, Songnam-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 488 days.

(21) Appl. No.: 09/691,799

(22) Filed: Oct. 19, 2000

(65) Prior Publication Data (65)

(30) Foreign Application Priority Data

Oct. 19, 1999 (KR) .......................... 1999-45332

(51) Int. Cl.[7] ................................ H04Q 7/20
(52) U.S. Cl. ................ 455/433; 455/67.11; 455/67.12; 455/465.3; 455/432.1; 370/335; 370/331
(58) Field of Search .......................... 455/432.1, 456.3, 455/456.1, 457, 446, 440, 525, 436, 67.11, 67.12, 433, 465.1, 69, 437; 370/335, 331

(56) References Cited

U.S. PATENT DOCUMENTS 6,173,186 B1 * 1/2001 Dalley ........................ 455/446
6,208,871 B1 * 3/2001 Hall et al. .................... 455/517
6,304,755 B1 * 10/2001 Tiedemann et al. .......... 455/437
6,320,855 B1 * 11/2001 Shi ............................. 370/332
6,456,606 B1 * 9/2002 Terasawa ..................... 370/331
6,490,313 B1 * 12/2002 Ganesh et al. .............. 375/130
6,553,230 B1 * 4/2003 Plestid et al. ............... 455/436
6,560,442 B1 * 5/2003 Yost et al. ................ 455/67.11
6,564,057 B1 * 5/2003 Chun et al. ................. 455/437

* cited by examiner

*Primary Examiner*—Charles Appiah
*Assistant Examiner*—Khawar Iqbal
(74) *Attorney, Agent, or Firm*—Cha & Reiter, L.L.C.

(57) ABSTRACT

Disclosed is a method for building a home-zone database using data measured while moving about the home-zone service area in a mobile communication system, which includes a mobile diagnostic monitor with a GPS antenna, a mobile telephone and a base station database. The method comprising the steps of: measuring the strength of a pilot signal received from each base station in the home-zone service area; deriving a line-fitting formula indicating a variation trend of the pilot strength of each PN (Pseudo Noise) offset according to the distance between the respective base station from the monitor device; generating a plurality of bins associated to the home-zone service area in the form of a grid; estimating the pilot strength of each bin by applying the line-fitting formula to the respective bin; and searching the base station database for the PN offsets corresponding to the pilot strengths estimated for the respective bins and reading the cell identification information for each searched PN offset to build a home-zone database.

14 Claims, 2 Drawing Sheets

METHOD FOR BUILDING A HOME-ZONE DATABASE USING MEASURED POWER STRENGTH

CLAIM OF PRIORITY

This application claims priority to an application entitled "Method for Building a Home-Zone Database Using Measured Power Strength" filed in the Korean Industrial Property Office on Oct. 19, 1999 and there duly assigned Serial No. 99-45332.

BACKGROUND OF THE INVENTION

1. Field of the Invention

The present invention relates generally to a method for building a home-zone database for a home-zone service in a mobile communication system, and in particular, to a method for building a home-zone database using the signal power strength measured via a pilot channel.

2. Description of the Related Art

In a home-zone service, a specified zone called, "home zone", is associated to a mobile subscriber so that different charging rates are applied depending on whether the subscriber initiates or receives a call within the boundary of the home zone.

Assume that a mobile user has subscribed to the home-zone service, designating a zone within a specified radius centering around his/her home as the home zone. In this case, when the subscriber talks over the mobile telephone within the home zone, a charging rate equal to that of the wired telephone charge rate will be applied to the subscriber. Yet, when the subscriber talks over the mobile telephone outside of the home zone, a normal charging rate of the mobile service will be applied to the subscriber.

When a subscriber applies for the home-zone service, the service provider typically defines the home zone based on several factors, such as the position information of the base stations, the coverage limit of each base station, the install information of the base stations and topographical information of the corresponding zone, and the address information provided by the subscriber. Hence, an accurate process of defining the home zone is very important for billing purposes to both the service provider and the subscriber.

During the process of measuring the signal strength to generate a home zone list defining the home zone, occasionally, the signal strength becomes low or undetectable even though the mobile station is located very close to the base station. The reliability of the home zone list, which is collected using Pseudo Noise (PN) signal strength, depends on the multipath characteristics of the surrounding environment. Thus, in the process of generating a home zone list, a particular area that should be included in the home zone list can be excluded if the corresponding Pseudo Noise (PN) signal strength is affected by the multipath characteristics, such as a building and other structures.

Since a home zone can be defined through a binning process, a particular bin may be excluded from the sector list if the PN signal strength is unascertainable due to the above mentioned multipath characteristics.

SUMMARY OF THE INVENTION

It is, therefore, an object of the present invention to provide a method for building a home-zone database using the signal power strength measured via the pilot channel.

Another object of the invention is to estimate the pilot strength in the associated bin position where the pilot signal strength is undetectable by applying a line-fitting formula for performing interpolation on the measured pilot signals.

To achieve the above and other objects, there is provided a method for building a home-zone database using actual simulation data measured while roaming the candidate home zone service area in a mobile communication system of the type having a mobile diagnostic monitor with a GPS antenna, a mobile telephone, and a base station database. The method comprising the steps of: measuring the strength of a pilot signal received from each base station in the home-zone service area; deriving a line-fitting formula indicating a variation trend of the pilot strength of each PN (Pseudo Noise) offset according to the distance between the respective base station from the monitor device; generating a plurality of bins associated to the home-zone service area in the form of a grid; estimating the pilot strength of each bin by applying the line-fitting formula to the respective bin; and searching the base station database for the PN offsets corresponding to the pilot strengths estimated for the respective bins and reading the cell identification information for each searched PN offset to build a home-zone database.

BRIEF DESCRIPTION OF THE DRAWINGS

The above and other objects, features, and advantages of the present invention will become more apparent from the following detailed description when taken in conjunction with the accompanying drawings in which:

FIGS. 2A and 2B are diagrams illustrating a memory structure of a mobile diagnostic monitor according to the embodiment of the present invention; and FIG. 3 is a diagram illustrating the structure of a base station database according to the embodiment of the present invention.

DETAILED DESCRIPTION OF THE PREFERRED EMBODIMENT

Figure 1:
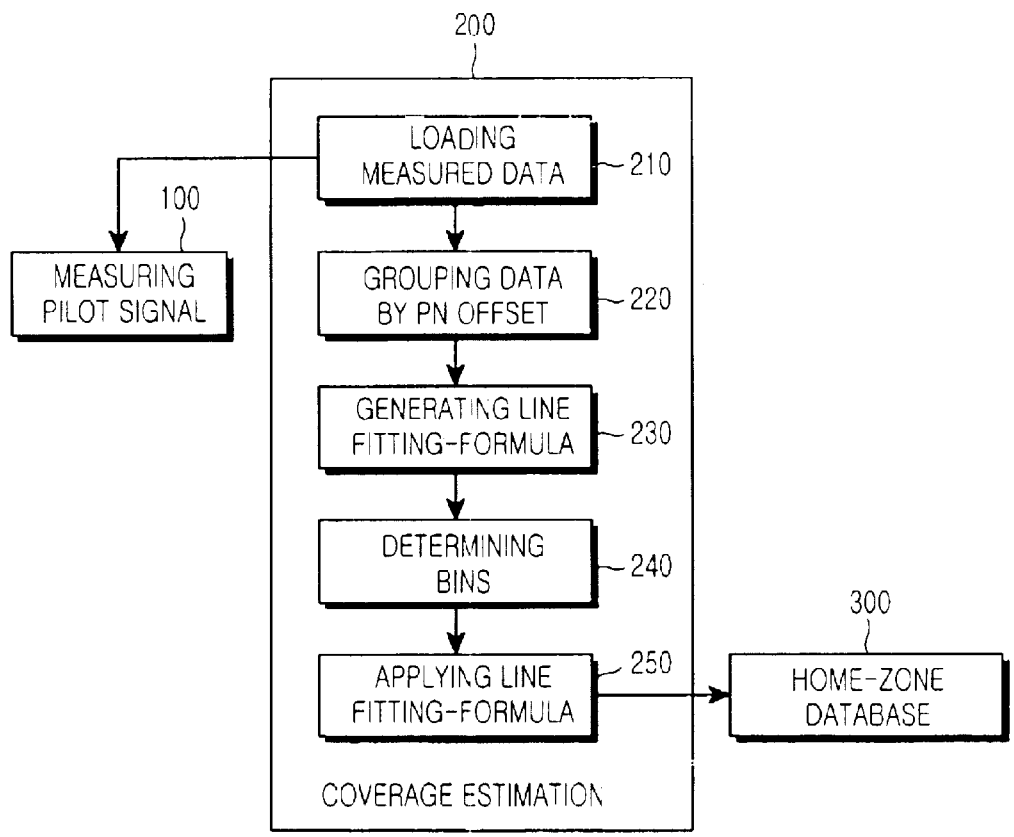
FIG. 1 is a diagram for explaining a procedure for building a home-zone database according to the embodiment of the present invention.

A preferred embodiment of the present invention will be described herein below with reference to the accompanying drawings. For the purpose of clarity, well-known functions or constructions are not described in detail since they would obscure the invention in unnecessary detail.

FIG. 1 illustrates a procedure for building a home-zone database using pilot signal strength measured through an actual simulation in accordance with the embodiment of the present invention.

In step 100, a mobile telephone in a vehicle equipped with a mobile diagnostic monitor and a GPS (Global Positioning System) antenna measures the power strength of a pilot signal received from a base station while moving around the service area to determine the coverage area of each base station in the system. During this process, the mobile unit is in an idle state. While roaming around potential home zone areas, the mobile telephone detects all possible pilot signals according to the PN (Pseudo Noise) offsets. The mobile diagnostic monitor displays and stores the measured pilot strength along with the GPS information (i.e., latitude/longitude position information of the mobile telephone).

In step 200, the coverage estimation according to the present invention is initiated. In step 210, the measured pilot strength data stored in the mobile diagnostic monitor is loaded in a memory. With regards to the format of the loaded data, since the mobile telephone in a certain position receives pilot signals from a plurality of base stations, the position information of the same mobile telephone is matched with a plurality of pilot strengths and their PN offsets, as shown in FIG. 2A.

In step 220, the loaded data is regrouped according to the PN offsets as shown in FIG. 2B. By doing so, each PN offset is matched with its own associated position information and pilot strength.

In step 230, a line-fitting formula indicating a variation of the pilot strength for each PN offset in relation to the distance is derived using a line-fitting algorithm. A conventional line fitting algorithm can be used to fit a corresponding line through the pilot strength points in each x-y graph. In order to build a home-zone database, it is easier to represent a desired home-zone service area in the form of a grid. However, it is not possible to obtain all the necessary data using the data measured in step 100 due to multipath characteristics. For example, there may exist some places where it is not possible to measure the pilot strength due to bad road conditions. In order to estimate the pilot strength in the non-measurable locations, a line-fitting formula for performing interpolation on the measured data is used as follows.

First, a base station database (not shown) is searched for a PN offset that is equal to the PN offset of the measured pilot strength. When the equal PN offset is found, the BS-GPS information, (i.e., position information of the corresponding base station) is read from the base station database. Then, the distance between the corresponding base station and mobile telephone is calculated based on the base station position information and the mobile telephone position information. Here, the distance between the base station and the mobile telephone is derived based on the level of pilot signal strength. That is, different levels of pilot signal strength corresponds to a wide range of distance, thus the distance between the base station and the mobile telephone can be determined based on the measured pilot signal strength.

Operation are then performed to determine which non-detectable pilot strength is closest to the known data by looking up the base station position information GPS1' from the base station database of FIG. 3 and the corresponding PN offset (PN—off1), which is stored in a memory of the mobile diagnostic monitor to represent the distance between the base station and the as shown in FIG. 2B. Hence, for the PN offset (PN—off1) and the pilot strength PLT1, the distance between the corresponding base station and the mobile telephone is equal to the difference between GPS1' and GPS1 (mobile telephone position information). Similarly, the distance from the GPS1' to the GPS2 and GPS3 matched to the PN offset (PN_off1) is calculated and then stored in the memory according to the corresponding pilot strength.

After calculating the respective distance using the tables of FIG. 2b and 3 in Step 230, it is now possible to generate a line-fitting formula indicating a variation trend of the pilot strength according to the respective distance using the line-fitting algorithm to determine the pilot signal strength that was undetectable in a particular region due to multipath characteristics. That is, it is possible to show the variation trend by drawing a graph in which the x-axis indicates the distance and the y-axis indicates the pilot strength. Then, a conventional fit-to-line statistical criterion is applied to relationships between the measured pilot signal strength and the respective distance, to determine a most preferred relationship upon which to base a fairly accurate approximation of the missing pilot signal strength in a given area. The above process is performed to other PN offsets (PN_off2) and (PN_off3), and the derived formulas are managed according to different PN offsets.

A-home-zone service area is typically represented in the form of grid. Here, the grid unit generated is called "bin". In Step 240, the binning process is performed. Each bin is assigned with its own unique index, and the bin size and the GPS information corresponding to the uppermost left bin is stored in the base station database. It should be noted that the binning process is well known to those skilled in this art.

In step 250, the line-fitting formula derived in step 230 is applied to each bin. Here, a given home zone area is represented by a plurality of bins. By associating the line-fitting formula determined in step 230 onto the plurality of bins used to define home zones, it is now possible to detect the GPS information corresponding to the upper left bin by referring to the base station database.

After detecting the GPS information of the corresponding bin, the distance from each base station with respect to the line-fitting formula is calculated by consulting the base station database shown in FIG. 3. For example, if GPSx indicates the GPS information of a particular bin with an index x, the distance from the base station with the PN offset (PN_off1) to that particular bin is equivalent to the difference between GPS1' and GPSx. Hence, any missing pilot strength values in a given bin can be determined by substituting the calculated distance values (i.e., GPS1'–GPSx) into the line-fitting formulas derived in step 230. This process can be performed to each bin as occasion demands. Here, only the distance values being larger than a threshold value are selected from the determined pilot strength values. The threshold value is a specified pilot strength which becomes a selection criterion for estimating the coverage area of the home zone.

The above operation is performed on every PN offset, then the selected pilot strength values and the corresponding PN offsets are stored and managed in a memory. Thereafter, the cell identification information (i.e., a site ID and a sector ID) corresponding to the respective PN offsets are searched from the base station database for every bin. In step 300, a home-zone database is built using the site ID and the sector ID determined for each bin. Here, the sector information is used to more narrowly define the home zone, which is a common practice known to those skilled in the art.

As described above, the invention builds the home-zone database for the home-zone service using the measured pilot strengths to provide more accurate database as compared to the simulation method in the event that some of the pilot strength is not detectable.

While the invention has been shown and described with reference to a certain preferred embodiment thereof, it will be understood by those skilled in the art that various changes in form and details may be made therein without departing from the spirit and the scope of the invention as defined by the appended claims.

What is claimed is:

1. A method for determining a home-zone database using a simulation data measured as a mobile unit roams around a plurality of locations in a mobile communication system, comprising the steps of:

(a) measuring a respective pilot signal strength and a PN(Pseudo Noise) offset received from a plurality of base stations within the system by a mobile diagnostic monitor that tracks its own position while measuring pilot signal strength;

(b) calculating a distance between the respective base station and the respective location based on a measured signal strength of the pilot signal measured in step (a);

(c) generating a graphical relationship between the measured pilot signal strength at each location and the calculated distance such that only a calculated distance above a predetermined threshold is used to define a home-zone boundary;

(d) generating a plurality of bins;

(e) estimating a new pilot signal strength for each bin by associating the generated graphical relationship to the plurality of the bins; and (f) searching a predetermined base station database to retrieve a cell identification information of the PN offset responsive to the estimated new pilot signal strength.

2. The method as recited in claim 1, further comprising the step of defining the home-zone database using the searched cell identification information.

3. The method as recited in claim 1, wherein the step(a) comprises the step of sorting the measured pilot signal strength according to the PN offsets associated to the plurality of base stations.

4. The method as recited in claim 1, wherein the step(b) of calculating the distance between the respective base station and the respective location is performed according to the level of the measured pilot signal strength.

5. The method as recited in claim 4, wherein the x-coordinate represents the measured pilot signal strength and the y-coordinate represents the calculated distance.

6. The method as recited in claim 1, wherein the step (b) comprises the step of associating the graphical relationship in x-y coordinates for each of the PN offset.

7. The method as recited in claim 1, wherein the step(c) of generating the graphical relationship is performed using a line fitting algorithm.

8. The method as recited in claim 1, wherein the step(c) comprises the steps of:

determining whether the predetermined base station database includes the same PN offset corresponding to the detected pilot signal strength in step(a);

reading a position information of the corresponding base station corresponding to the same PN offset;

calculating a distance between the base station and the mobile unit based on the position information of the base station in the predetermined base station database and a position data of the mobile unit at the each location; and deriving the line-fitting formula indicating the variation trend of the pilot strength according to the calculated distance and a line-fitting algorithm.

9. The method as recited in claim 1, wherein the step(e) comprises the steps of:

detecting a position data of each bin from the predetermined base station database;

calculating a distance from each of the base station and the detected position data of each bin;

calculating the new pilot signal strength exceeding a predetermined threshold value by substituting the calculated distance into the corresponding line-fitting formula; and searching the predetermined base station database for the corresponding PN offset and the cell identification information corresponding to the calculated new pilot signal strength.

10. A method for building a home-zone database using a data measured while roaming around potential home-zone service areas in a mobile communication system, the method comprising the steps of:

(a) detecting, by an idle mobile unit, a pilot signal having a PN(Pseudo Noise) offset from each base station at a plurality of locations within the system and storing the strength of the detected pilot signal strength and the corresponding position data by a mobile diagnostic monitor that tracks its own positions while measuring pilot signal strength;

(b) rearranging the detected pilot signal strength and the matching position data according to the PN offset;

(c) deriving a line-fitting formula for each detected PN offset indicating a variation trend of the pilot signal strength according to the distance between the mobile unit and each of the base station base stations;

(d) generating a plurality of bins to define the hone-zone service areas;

(e) estimating a new pilot signal strengths exceeding a predetermined threshold value by associating the line-fitting formula to each of the bins; and (f) searching a predetermined base station database to retrieve a cell identification information for the PN offset corresponding to the estimated new pilot signal strength.

11. The method as recited in claim 10, wherein the step(c) comprises the steps of:

determining whether the predetermined base station database includes the same PN offset matching the PN offset corresponding to the detected pilot signal strength in step(a);

reading a position information of the corresponding base station corresponding to the same PN offset;

calculating a distance between the base station and the mobile unit based on the level of the detected pilot signal strength; and deriving the line-fitting formula according to the calculated distance and a line-fitting algorithm.

12. The method as recited in claim 11, wherein the cell identification information includes a cite identification (ID) and a sector identification ID for defining the home-zone area.

13. The method as recited in claim 12, wherein the position data of the corresponding bin is calculated using a GPS information corresponding to a reference bin stored in the base station database and the distance between bins, wherein the reference bin being a left uppermost bin.

14. The method as recited in claim 10, wherein the step(e) comprises the steps of:

detecting a position data of each bin from the predetermined base station database;

calculating a distance from each base station and the detected position data of each bin;

calculating the new pilot signal strength exceeding a predetermined threshold value by substituting the calculated distance into the corresponding line-fitting formula; and searching the predetermined base station database for the corresponding PN offset and the cell identification information corresponding to the calculated new pilot signal strength.

* * * * *